UNITED STATES PATENT OFFICE.

JOHN WALTER MEADER, OF INDIANAPOLIS, INDIANA, ASSIGNOR TO THE ELI LILLY AND COMPANY, OF INDIANAPOLIS, INDIANA, A CORPORATION.

CEPHAELIN AMYL ETHERS AND PROCESS OF PRODUCING SAME.

1,219,574.   Specification of Letters Patent.   Patented Mar. 20, 1917.

No Drawing.   Application filed January 25, 1916.   Serial No. 74,256.

*To all whom it may concern:*

Be it known that I, JOHN WALTER MEADER, a citizen of the United States, residing at Indianapolis, in the county of Marion and State of Indiana, have invented new and useful Cephaelin Amyl Ethers and Process of Producing Same, of which the following is a specification.

This invention relates to the previously unknown cephaelin amyl ethers, to which may be given the formula $C_{28}H_{37}O_3N_2OC_5H_{11}$ in which the hydrogen of the hydroxyl group of cephaelin has been replaced by an amyl group.

This compound is a valuable medicinal product. Its uses are similar to those of emetin and it may be administered in larger doses than said product owing to its less toxicity.

Taking as a specific embodiment of the invention, cephaelin isoamyl ether, such compound may be prepared by treating cephaelin with an alkali metal and an isoamyl haloid, and isolating the cephaelin isoamyl- ether by suitable methods. The process in detail may be carried out as follows:

46.6 grams of cephaelin and 4.6 grams of sodium are dissolved in about 400 c. c. of absolute alcohol, about 17 grams of isoamyl bromid added, and the solution boiled under a reflux condenser for at least two hours. Cephaelin isoamyl ether which now exists in solution is isolated by recovering the alcohol, dissolving in dilute hydrochloric acid, making ammoniacal and extracting with ether. The ether solution of cephaelin isoamyl ether and unchanged cephaelin is extracted with an excess of dilute caustic soda solution to remove the cephaelin, and evaporated to dryness on a water bath. The compound may be further purified by dissolving in an acid, crystallizing as a salt, dissolving in water, making ammoniacal, extracting with ether, recovering the ether, and drying in vacuum. Other amyl ethers are prepared by substituting other amyl haloids in the above process.

In the above process, potassium may be substituted for sodium and isoamyl iodid for isoamyl bromid. The absolute alcohol may be replaced by any other suitable solvent, for instance amyl alcohol.

Cephaelin isoamyl ether is a varnish like substance easily soluble in alcohol, ether, and chloroform. It dissolves in acids to form salts. The hydrobromid of cephaelin isoamyl ether crystallizes in white needles. The hydrochlorid, and nitrate of cephaelin isoamyl ether are also crystalline.

What I claim is:

1. An amyl ether of cephaelin.
2. The isoamyl ether of cephaelin.
3. A monoamyl derivation of cephaelin.
4. An amyl compound of cephaelin containing essentially the atomic aggroupment $C_{28}H_{37}O_3N_2O_5H_{11}$.
5. The process of producing an amyl ether of cephaelin comprising adding to cephaelin an alkali metal, an amyl haloid and a solvent.
6. The process of producing cephaelin isoamyl ether comprising adding to cephaelin an alkali metal, an isoamyl haloid and a solvent.
7. The process of producing cephaelin isoamyl ether by treating cephaelin with sodium ethylate and isoamyl bromid.
8. The process of producing an amyl ether of cephaelin which comprises treating cephaelin with an alkali metal alcoholate and an amyl haloid.

In witness whereof, I, JOHN WALTER MEADER, have hereunto set my hand at Indianapolis, Indiana, this 24th day of January, A. D. nineteen hundred and sixteen.

JOHN WALTER MEADER.